Dec. 6, 1955

H. WINET 2,726,041

GAS OVEN TEMPERATURE REGULATOR

Filed Oct. 2, 1951

INVENTOR:
HANS WINET
BY
Morgan, Finnegan & Durham
ATTORNEYS.

Dec. 6, 1955

H. WINET 2,726,041

GAS OVEN TEMPERATURE REGULATOR

Filed Oct. 2, 1951

INVENTOR:
HANS WINET
BY
Morgan, Finnegan + Durham
ATTORNEYS.

United States Patent Office 2,726,041
Patented Dec. 6, 1955

2,726,041

GAS OVEN TEMPERATURE REGULATOR

Hans Winet, Zurich-Wollishofen, Switzerland, assignor to Landis & Gyr, A. G., a body corporate of Switzerland Application October 2, 1951, Serial No. 249,273

Claims priority, application Switzerland July 9, 1951

4 Claims. (Cl. 236—99)

The present invention relates to a novel and improved temperature regulator for controlling the flow of gas to a gas oven to produce the desired oven temperature.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Figure 2:
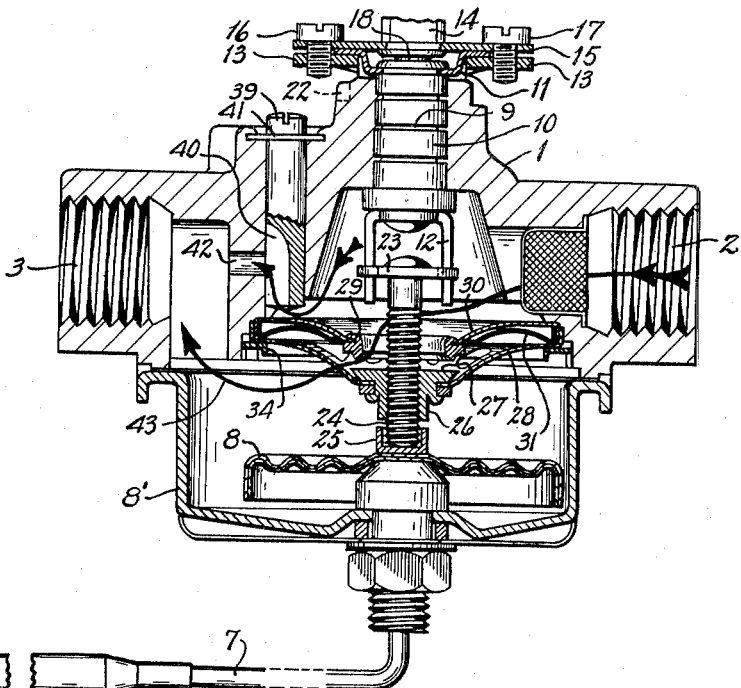
Figure 2 is a sectional view taken on the line II—III of Figure 1.

The present invention has for its object the provision of a novel and improved gas oven temperature regulator of simplified construction which is entirely reliable in operation. A further object is the provision of a gas oven temperature regulator having a regulator valve which forms a constructional unit and can be mounted and replaced as a whole. A further object is the provision of a regulator valve unit which is exceedingly compact, has a small number of parts which are not readily dearranged and is adapted to be mounted directly on an adjusting spindle actuated by the thermally responsive element of the thermostat.

The present invention provides a temperature regulator of improved construction for gas baking ovens, the regulator being provided with a temperature responsive diaphragm which acts directly on a valve spindle on which is threadedly mounted a valve unit. The valve unit comprises a sleeve threaded to receive the spindle and a coaxial ring adapted to be moved toward and away from a part of the sleeve which forms the valve seat, the sleeve and ring being interconnected by means of a pair of valve discs, one of which is formed as a disc spring so that the valve parts have relative resilient movement with respect to each other under control of the threaded spindle, as the temperature responsive diaphragm is moved and the outer edges of the valve discs are held against movement. At their outer edges the valve discs are provided with means for securely anchoring the valve unit in the regulator body so that the discs are also held against rotational movement as the threaded member is turned to change the temperature setting of the regulator.

The present invention is in many respects an improvement on the gas oven temperature regulator disclosed in the prior application of Hans Winet and Albert Käser, Serial Number 223,493, filed April 28, 1951, now Patent No. 2,694,525, but in other respects the invention is of more general application.

It will be understood that the foregoing general description and the following detailed description as well are exemplary and explanatory of the invention but are not restrictive thereof.

Referring now in detail to the present preferred and illustrative embodiment of the invention as shown in the accompanying drawings, the regulator is shown as adapted for installation on a domestic gas oven. A bulb 6 filled with the expansion liquid is to be positioned within the oven whose temperature is to be controlled and is connected by means of a capillary tube with the diaphragm unit 8, so that an increase in the temperature of the oven causes the diaphragm members to be spaced apart, especially near their centers, the spacing of the diaphragm members thus being proportional to the temperature of the oven as the oven is heated by the gas supplied to it.

In the regulator housing 1 is rotatably mounted a regulator shaft 10 which is formed with packing grooves 9 and is rigidly connected at its outer end with an indexed dial member 11, and at its inner end with a coupling yoke 12. The indexed dial 11 is positioned between a limiting flange 13 and a pointer flange 15 rigidly connected to a driving shaft 14 and clamped between these parts by means of the screws 16 and 17, so that the driving shaft 14 and the regulator shaft 10 are rotatable towards each other and can be fixed in a definite position. A cylindrical extension 18 of the regulator shaft projecting into the driving shaft 14 centers the two shafts with respect to each other.

Figure 1:
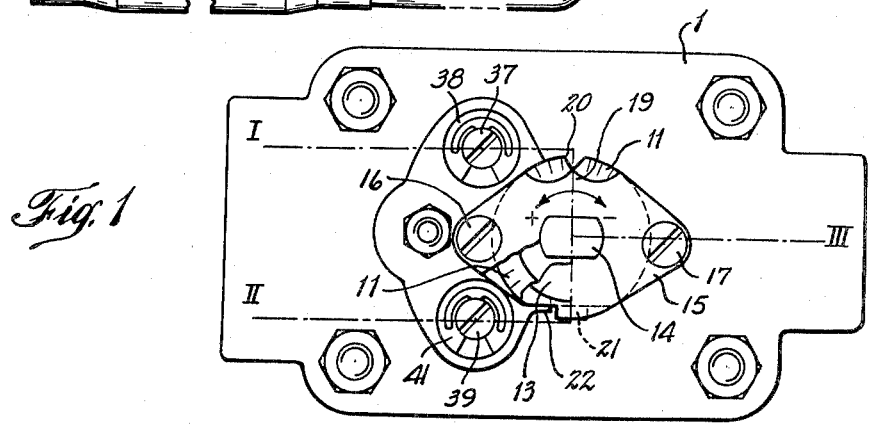
Figure 1 is a top plan view of the present preferred and illustrative embodiment of a gas oven temperature regulator in accordance with the present invention.

As shown in Figure 1, the pointer flange 15 is provided with a pointer which is formed by the intersection of two circular sectors blanked out of the flange, and serves for the calibration of the regulator, as will be described later.

One face of the diaphragm unit 8 is anchored on the regulator housing 1 by means of a stamped cup 8', and the movable disc portion of the unit 8 is proivded with a seat 25 which receives and locates the end of the threaded spindle 24. The stamped cup portion 8' forms a gas tight chamber with the hollow interior of the housing 1 which receives the gas from the inlet 2 and supplies gas to the main outlet 3 as well as to the pilot light connection 4.

For rotating the threaded spindle while allowing it to move freely under the influence of the diaphragm unit 8, coupling yoke 12 engages in two slots at the periphery of the coupling disc 23 which is fast on the end of the valve spindle 24, and by rotating the yoke 12, spindle 24 is rotated in the guide cap 25.

The valve unit which is mounted on and moved by the threaded spindle 24 comprises a sleeve nut 26, threaded on the spindle 24 and positioned between the cup 25 and the yoke 12. The face of the sleeve nut 26 towards the yoke 12 is formed as a flat valve 27 and is adapted to cooperate with a valve seat 29, the seat 29 having a relatively sharp edge adjacent the valve 27 and adapted to contact therewith to close the passageway for gas which is controlled by the relative movement of the valve 27 and the ring 29. Valve 27 and the valve seat 29 are mounted with respect to each other by means of slotted spring disc 28 fixed to the sleeve nut 26, and a solid disc 30 fixed to the valve seat 29. The sleeve nut 26, valve seat 29, slotted spring disc 28 and the solid disc 30 are all coaxial with each other and normally spaced apart, and the slotting of the disc 28 not only provides for the flow of gas through this disc, but also makes the disc 23 relatively weaker as a spring than the solid disc 30, while the internal diameter of the valve seat 29 is considerably larger than the exterior diameter of the threaded spindle 24.

At their outer edges discs 28 and 30 are bent over towards each other and are fitted into each other so that relative movement of the discs at their edges is prevented, and relative movement between the valve parts 26 and 29 is thus provided for by the resiliency of the slotted spring disc 28. Between the disc spring 28 and the relatively stiff disc 30 is provided a stop disc 31 having its outer edge bent over and secured by friction against the bent-over edges of the discs 28 and 30, while the inner edge of the stop disc is formed as a circular aperture, coaxial with the discs 28 and 30 and the spindle 24 and is so positioned to limit movement of the valve seat 29 towards the valve 27 on the spindle nut 26, while permitting some movement of the valve seat in the opposite direction in case valve 27 is pressed too hard against the valve seat 29, as might happen when the dial shaft 10 is turned to a lower temperature while the oven is still hot.

On the valve unit and at the side adjacent the diaphragm unit 8 is a guard ring 34 having resilient arcuate wings 32 spaced around its outer edge which are adapted to engage in a groove 33 formed in the housing 1 adjacent the circular seat in which the valve unit as a whole is mounted, the wings serving to press the valve unit against the shoulder 35 of the circular seat to form a gas tight joint therewith.

Figure 4:
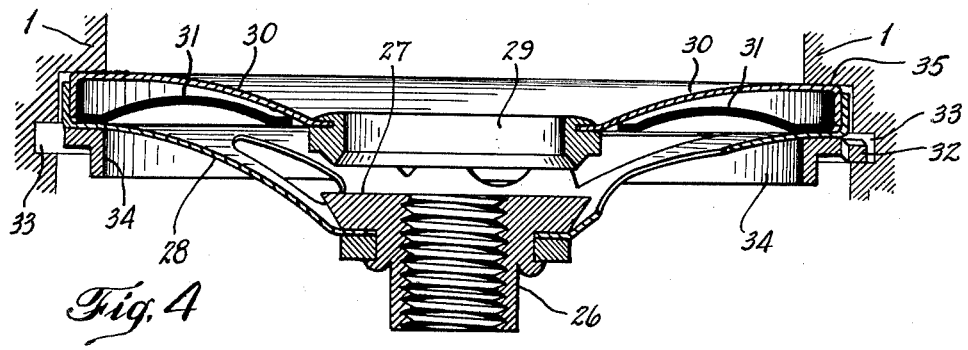
Figure 4 is a cross sectional view of the regulator valve, which is also shown in Figures 1 to 3 on a smaller scale.
Figure 6:
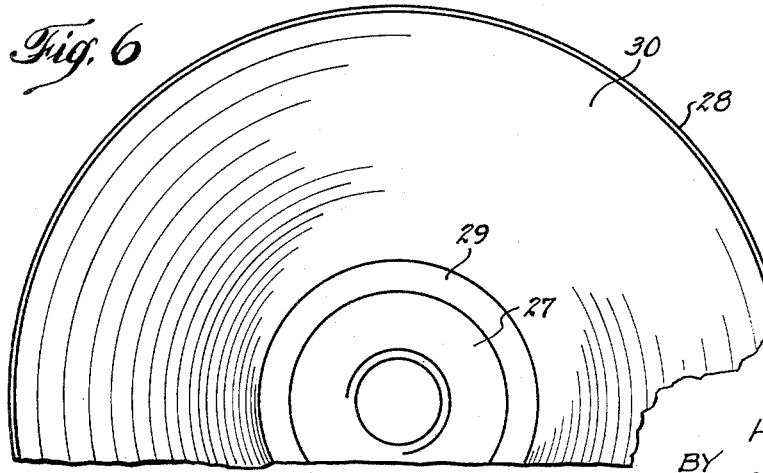
Figure 6 is a top plan view of the valve shown in Figures 4 and 5.

Figure 4 of the drawings shows the valve unit in its relaxed position, with spring disc 28 urging the valve 27 away from the valve seat 29 so as to permit passage of gas through the space between the parts 27 and 29, and with the disc spring 28 unstressed by the spindle 24. As spindle 24 is turned to a lower temperature position, spindle nut 26 forces the valve 27 against the valve seat 29 against the action of spring disc 28 so as to close or reduce the passageway between the valve parts 27 and 29. The discs 28 and 30 are preferably both flared or bell-shaped in the same direction, and flared outwardly away from the diaphragm unit 8.

Figure 3:
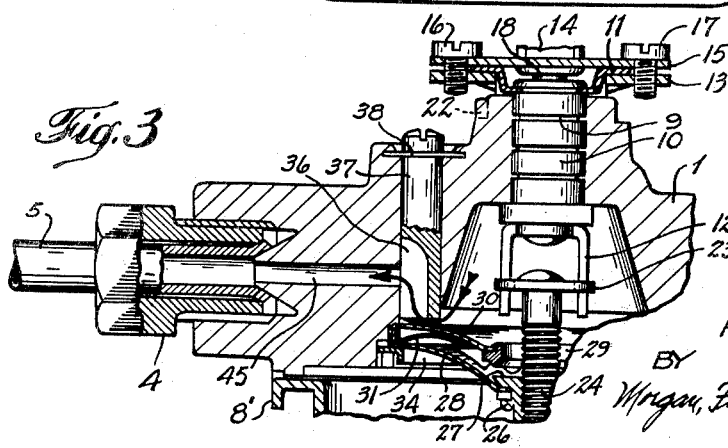
Figure 3 is a fragmentary sectional view taken on the line I—III of Figure 1.
Figure 5:
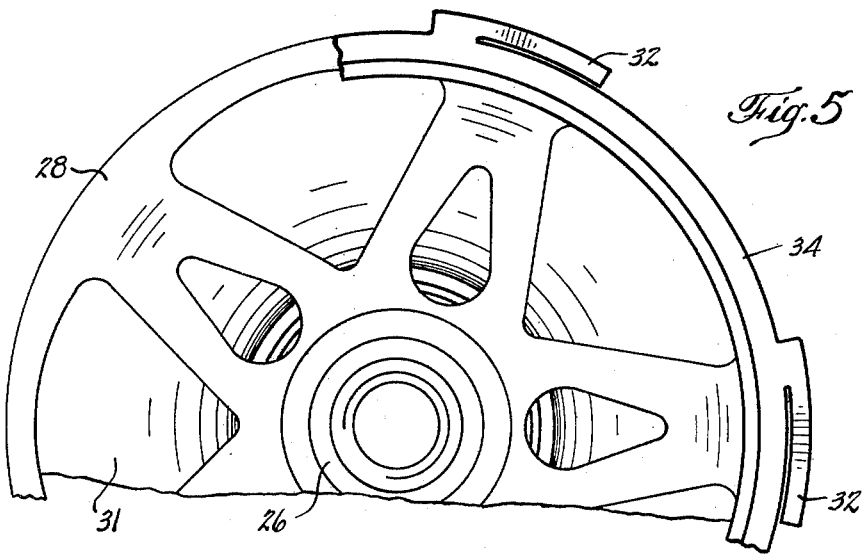
Figure 5 is a fragmentary bottom plan view of the valve shown in Figure 4.

Means are provided for supplying gas to the pilot light in the oven, and for this purpose the pilot light supply line 5 is connected to a suitable aperture in the housing by means of a fitting 4, the aperture communicating directly with the hollow interior of the housing and the gas inlet 2 and not being controlled by the valve unit. The flow of gas to the pilot line 5 is, however, controlled by means of a cylindrical plug 37 which is provided with a slot 36 (Figure 3) and the plug 37 may be rotated to vary the amount of gas passed by the slot 36, the plug being fixed in an axial position and held against accidental displacement by means of the spring washer 38 secured in a seat formed in the housing 1. A similar plug 39 (Figure 1) with its slot 40 and spring washer 41 serves as a by-pass to permit passage of gas to the main oven burner when the regulating valve is closed.

During the operation of the regulator, the expansible liquid in the heat-responsive bulb, exposed to the temperature of the oven, causes displacement of the diaphragm 8 and a corresponding movement of the guide cap 25 in one direction or the other, causing a corresponding axial movement of the spindle 24. Such movement of the diaphragm 8 and the spindle 24 is transmitted directly to the sleeve nut 26 and the valve seat, against the pressure of the spring disc 28, to cause the seat to move towards or away from the valve seat 29, thereby regulating the flow of gas along the path indicated by the main arrow 43 in Figure 2, this flow of gas passing through the space between the valve parts 27 and 29 and around the spindle 24, as the gas flows from the inlet 2 to the outlet 3. As the temperature of the bulb 6 increases the flow of gas is diminished, and a reduction in the temperature causes an increase in the flow of gas to the oven. An increase in the flow of gas is also caused by rotating of the spindle 24 by turning of the shaft 14 in one direction, and a decrease in the flow of gas is similarly caused by turning of the shaft in the opposite direction, thereby allowing regulation of the flow of gas according to the desired temperature.

In the zero position of the manual setting knob or dial, the flow of gas is completely shut off through the valve passage between the parts 27 and 29, and gas is supplied only through the by-pass 42 and the pilot light passageway 45.

In the initial calibration of the regulator, the screws 16 and 17 may be loosened, and then the shaft 14 may be rotated relatively to the shaft 10, thereby bringing one or another of the calibration marks 11 opposite the pointer 19. When the correct setting has been obtained, the shafts 10 and 14 are locked to each other by tightening the screws 16 and 17, thereby maintaining proper adjustment of the regulator as a whole.

Flange 13 is preferably provided with a bent nose portion 21, bent towards the housing 1 and adapted to cooperate with a stop 22 formed as an integral portion of the housing to limit rotational movement of the shafts 10 and 14, and establishing the zero position of the regulator.

The invention in its broader aspects is not limited to the specific mechanisms shown and described but departures may be made therefrom within the scope of the accompanying claims without departing from the principles of the invention and without sacrificing its chief advantages.

What is claimed is:

1. A temperature regulator for a gas heated oven including in combination a housing having a passageway therethrough for the gas supplied to the oven, a temperature responsive diaphragm unit, a threaded spindle axially moved by the diaphragm, a valve controlling the flow of gas, said valve comprising a valve member adjustably threaded on the spindle, a disc-like spring, a valve seat supported by the spring adapted to engage the valve member and with the disc serving to close the passageway, and spring means tending to space the valve seat and valve member apart against the action of the diaphragm unit said spring means comprising a perforated disc supported at its edges on said disc-like spring.

2. A temperature regulator as claimed in claim 1 in which the housing is formed with a circular seat in which the disc-like springs are seated.

3. A temperature regulator as claimed in claim 2 in which the discs are provided with arcuate wings at their periphery for holding the discs in the circular seat.

4. A temperature regulator as claimed in claim 1 in which a stop is positioned between the discs and limits movement of the valve ring member towards said diaphragm unit.

UNITED STATES PATENTS

References Cited in the file of this patent

| Number | Name | Date |
|---|---|---|
| 249,612 | Grinnell | Nov. 15, 1881 |
| 2,045,289 | Bolin | June 23, 1936 |
| 2,185,422 | Prutton et al. | Jan. 2, 1940 |
| 2,237,398 | Waddell | Apr. 8, 1941 |
| 2,302,407 | Waddell | Nov. 17, 1942 |
| 2,381,541 | Hoy | Aug. 7, 1945 |
| 2,403,777 | Yonka | July 9, 1946 |